US009340748B2

(12) United States Patent
Phillips

(10) Patent No.: US 9,340,748 B2
(45) Date of Patent: *May 17, 2016

(54) EXTRACTION OF SOLUTE FROM SOLUTE-BEARING MATERIAL

(71) Applicant: EPIC OIL EXTRACTORS, LLC, Ponchatoula, LA (US)

(72) Inventor: Darrell J. Phillips, Zachary, LA (US)

(73) Assignee: Epic Oil Extractors, LLC, Ponchatoula, LA (US)

( * ) Notice: Subject to any disclaimer, the term of this patent is extended or adjusted under 35 U.S.C. 154(b) by 321 days.

This patent is subject to a terminal disclaimer.

(21) Appl. No.: 13/829,049

(22) Filed: Mar. 14, 2013

(65) Prior Publication Data

US 2013/0303794 A1    Nov. 14, 2013

Related U.S. Application Data

(63) Continuation of application No. 12/604,187, filed on Oct. 22, 2009, now Pat. No. 8,398,857.

(51) Int. Cl.
| | |
|---|---|
| *B01D 1/00* | (2006.01) |
| *B01D 11/02* | (2006.01) |
| *C11B 1/10* | (2006.01) |
| *C11B 3/00* | (2006.01) |
| *C11B 13/00* | (2006.01) |

(52) U.S. Cl.
CPC . *C11B 3/006* (2013.01); *B01D 1/00* (2013.01); *B01D 11/02* (2013.01); *C11B 1/10* (2013.01); *C11B 13/00* (2013.01); *Y02W 30/74* (2015.05)

(58) Field of Classification Search
CPC .... B01D 11/00; B01D 11/04; B01D 11/0492; B01D 37/00; B01D 11/02; B01D 11/0288; B01D 11/0292; B01D 1/00; B01D 3/00; C11B 1/10; C11B 1/108; C11B 1/02; C11B 3/006; C11B 1/08; C11B 13/00; Y02W 30/74

USPC .......... 210/511, 634, 639, 774, 806; 422/255–259; 554/8–21, 174, 175

See application file for complete search history.

(56) References Cited

U.S. PATENT DOCUMENTS

| | | | | | |
|---|---|---|---|---|---|
| 3,111,393 | A | * | 11/1963 | Cavanagh | 422/273 |
| 3,408,374 | A | * | 10/1968 | Cavanagh et al. | 554/14 |
| 4,221,658 | A | * | 9/1980 | Hardwick | 210/634 |
| 4,391,711 | A | * | 7/1983 | Jackson et al. | 210/634 |
| 4,645,512 | A | * | 2/1987 | Johns | 23/293 R |
| 5,707,673 | A | * | 1/1998 | Prevost et al. | 426/417 |
| 6,248,910 | B1 | * | 6/2001 | Franke | 554/12 |
| 7,384,557 | B2 | * | 6/2008 | Phillips et al. | 210/634 |
| 8,603,328 | B2 | * | 12/2013 | DeLine et al. | 210/85 |
| 8,741,144 | B2 | * | 6/2014 | Phillips et al. | 210/634 |
| 2003/0201022 | A1 | * | 10/2003 | Kawai et al. | 137/828 |
| 2005/0092682 | A1 | * | 5/2005 | Phillips et al. | 210/634 |

OTHER PUBLICATIONS

Ernest Reverchon, "Supercritical fluid extraction and fractionation of essential oils and related products", Journal of Supercritical Fluids, vol. 10, 1997, pp. 1-37.*
K.S.M.S. Raghavarao et al, Electrokinetic Demixing of Aqueous Two-Phase Systems. Biotechnological Progress, 1998, vol. 14, pp. 922-930.*
Carlos H. Villa et al, "Internal Coalescence as a Mechanism of Instability in Water-in-Oil-in-Water Double Emulsion Globules", Langmuir, 2003, vol. 19, pp. 244-249.*

* cited by examiner

*Primary Examiner* — Joseph Drodge
(74) *Attorney, Agent, or Firm* — Dickinson Wright PLLC

(57) ABSTRACT

This invention is directed to a process for separating a solute from a solute-bearing material. A substantial amount of solute is extracted from the solute-bearing material by contacting particles of the solute-bearing material with globules of an extraction solvent. The particle size of the solute-bearing material and the globule size of the extraction solvent are balanced such that little if any solute or extraction solvent remains in the solute-bearing material.

4 Claims, No Drawings

US 9,340,748 B2

EXTRACTION OF SOLUTE FROM SOLUTE-BEARING MATERIAL

CROSS-REFERENCE TO RELATED APPLICATIONS

This is a continuation application which claims benefit to Non-provisional application Ser. No. 12/604,187, filed Oct. 22, 2009, which is incorporated herein by reference.

FIELD OF THE INVENTION

This invention relates to the extraction of solute from solute-bearing material. The invention is particularly suited to extracting oil from oil-bearing material.

BACKGROUND OF THE INVENTION

In nature, a variety of solute-bearing materials can be found in which the solute in the material can be utilized in a variety of ways. For example, plant materials can contain a variety of oil type compositions that can be used as edible oils or as fuels. Likewise, oil sands contain petroleum type oils that can be recovered and ultimately used as feedstocks for the production of fuels or lubricants.

The extraction of solute from solute-bearing material can be carried out in a variety of ways. In some cases, the solute is extracted by pressing. In others, the solute is extracted using an appropriate solvent.

U.S. Pat. No. 5,707,673 discloses a solvent extraction type process in which a mixture of a solvent is used to extract an extractive from extractive-containing material in an extraction zone. A miscella comprising a portion of the process solvent and a portion of the extractive, and an extractive-depleted substrate is formed, and the miscella is removed from the extraction zone. The removed miscella is filtered by use of a microfiltration, an ultrafiltration, a nanofiltration, or a reverse osmosis membrane to separate the solvent in the miscella from the extractive in the miscella, and at least a portion of the separated solvent is recycled to the extraction zone.

U.S. Pat. No. 7,384,557 discloses a process for separating a solute from a solute-bearing product. The solute-bearing solid product is fed to an extraction chamber equipped with an auger adapted to promote a free-floating flow of product. A solvent is injected into the extraction chamber through at least one spray nozzle extending so as inject the solvent in a vortex-shaped solvent spray pattern to contact the flow of product. A mixture of the leached solute and solvent is collected from the extraction chamber, and the leached solute is separated from the solvent.

More efficient processes are sought to extract solute from solute-bearing materials. It is particularly desirable to obtain processes that are highly efficient in extracting oils that can be used as edible materials or that can be used as feedstocks for the production of fuels or lubricants.

SUMMARY OF THE INVENTION

This invention provides processes that are highly efficient in extracting solute from solute-bearing material. The invention is particularly advantageous in extracting oil-containing solute from animal, vegetable, or mineral materials, including marine and waste materials, using a solvent. The result of the invention is that a high percentage of solute is extracted, with a very low amount of solvent remaining in the solute-bearing material.

According to one aspect of the invention, there is provided a process for extracting a solute from a solute-bearing material. The process comprises contacting particles of the solute-bearing material with globules of an extraction solvent in an extraction chamber to extract at least a portion of the solute from the solute-bearing material. Following extraction, the extracted solute can be separated from the extraction solvent.

In one embodiment of the invention, the particles and globules are fed to the extraction chamber at an average particle size to average globule size ratio of from 1:0.5 to 1:3. Preferably, a majority of the particles fed to the extraction chamber pass through a 5 mesh sieve, but are retained by a 40 mesh sieve. Alternatively, the particles fed to the extraction chamber have an average particle size of from 400 microns to 3400 microns.

In another embodiment, the globules of extraction solvent are injected into the extraction chamber at an average globule size of from 500 microns to 2500 microns.

Preferably, the extraction solvent is fed to the extraction chamber such that a major portion of the extraction solvent is fed in its liquid state.

In one embodiment, the particles of solute-bearing material are contacted with the globules of extraction solvent at an extraction chamber pressure greater than that of the solvent's vapor pressure. Preferably, the solvent has a vapor pressure of at least 1 atm at a temperature of 50° C.

A mixture of the extracted solute and solvent is preferably collected from the extraction chamber. The solute is then separated from the solvent.

DETAILED DESCRIPTION OF THE INVENTION

I. Overall Process

This invention is directed to a process for separating a solute from a solute-bearing material. The process results in a substantial extraction of solute from the solute-bearing material, while leaving little if any extraction solvent in the solute-bearing material.

A substantial amount of solute is extracted from the solute-bearing material in this invention by contacting particles of the solute-bearing material with globules of an extraction solvent. The particle size of the solute-bearing material and the globule size of the extraction solvent are balanced such that little if any solute or extraction solvent remains in the solute-bearing material. The solute material can be relatively easily separated from the extraction solvent, and the solid material from which the solute has been extracted can be further processed or discarded.

II. Solute-Bearing Material

The solute-bearing material from which solute can be extracted according to the process of this invention is a particulate material having a solute content of at least 0.5 wt %, based on total weight of the solute-bearing material. Preferably, the solute-bearing material has a solute content of at least 1 wt %, more preferably at least 2 wt %, and most preferably at least 3 wt %, based on total weight of the solute-bearing material.

The solute content of the solute-bearing material is preferably measured according to the Dean-Stark method (ASTM D95-05e1 Standard Test Method for Water in Petroleum Products and Bituminous Materials by Distillation). The Dean-Stark method can be use to determine the weight percent of oil in an oil sand sample as well as water content. A sample is first weighed, then solute is extracted using solvent.

The sample and solvent are refluxed under a condenser using a standard Dean-Stark apparatus. Water (e.g., water extracted from sample along with solute) and organic material (e.g., solvent and extracted solute) condense to form two phases in the condenser The two layers can be separated and weight percent of water and solute can be determined according to the standard method.

The solute-bearing material is a solid material at 50° C. and can be animal, vegetable or mineral material, including marine and waste material. The solute that is to be separated from the solute-bearing material is contained in or adsorbed to the solute-bearing material.

A solute is considered to be a substance that can be dissolved in another substance, i.e., a solvent. As an example, gas solutes can be dissolved in liquid solvents, liquid solutes can be dissolved in other liquid solvents, and solid solutes can be dissolved in liquid solvents or other solid solvents (e.g., alloy materials).

According to one aspect of this invention, the solute is comprised of an oil. An oil is a substance that is in a viscous liquid state at ambient temperatures or slightly warmer, and is both hydrophobic (immiscible with water) and lipophilic (miscible with other oils, literally). For purposes of this invention, ambient is considered to refer to 25° C. However, in this invention, it is also preferred the oil be in its viscous liquid state at 35° C. These oils include compounds of various classes with otherwise unrelated chemical structures, properties, and uses, and include compounds comprised of carbon and hydrogen atoms, and optionally varying amounts of oxygen, sulfur and nitrogen Examples of such oils include vegetable oils, petrochemical oils, compositions similar to petrochemical oils, and volatile essential oils. Oils of this nature are also considered nonpolar substances.

In embodiments in which the solute-bearing material is comprised of animal material, vegetable material, or a combination thereof, the solute being extracted can include a fat or wax material. Fats can include a wide group of compounds that are generally soluble in organic solvents and largely insoluble in water. Examples of fats include triesters of glycerol and fatty acids. In this invention, fats are considered to be more highly viscous than oils at ambient temperatures or slightly warmer. Waxes can include a wide variety of long-chain alkanes, esters, polyesters and hydroxy esters of long-chain primary alcohols and fatty acids, and are generally more viscous than oils at ambient temperatures or slightly warmer. Waxes are usually distinguished from fats in that waxes substantially lack triglyceride esters of glycerin (propan-1,2,3-triol). Waxes of plant materials can include mixtures of substituted long-chain aliphatic hydrocarbons, containing alkanes, fatty acids, primary and secondary alcohols, diols, ketones, and aldehydes. Paraffin waxes are hydrocarbons, mixtures of alkanes usually in a homologous series of chain lengths.

In one embodiment of the invention, the solute is comprised of vegetable oil and the solute-bearing material is vegetable material. The vegetable material is provided as or made into particles of desired particle size. The material is then contacted with the solvent, such as in an extraction chamber, so as to extract at least a portion of the oil.

Edible oils can be extracted according to this invention. Examples of major edible oils that can be extracted according to this invention include coconut oil, corn oil, cottonseed oil, canola oil, olive oil, palm oil, peanut oil, safflower oil, sesame oil, soybean oil, and sunflower oil. Other examples include amaranth oil, apricot oil, argan oil, artichoke oil, avocado oil, babassu oil, ben oil, Borneo tallow nut oil, cocoa butter, carob pod oil, cohune oil, coriander seed oil, dika oil, false flax oil, flax seed oil, grape seed oil, hemp oil, kapok seed oil, lallemantia oil, marula oil, meadow foam seed oil, mustard oil, okra seed oil, perilla seed oil, pequi oil, pine nut oil, poppy seed oil, prune kernel oil, quinoa oil, ramtil oil, rice bran oil, royle oil, tea oil, thistle oil, and wheat germ oil.

Nut oils can also be extracted. Examples of such oils include almond oil, cashew oil, hazelnut oil, macadamia oil, pecan oil, pistachio oil, and walnut oil.

Oils from the plant family Cucurbitaceae can be extracted, particularly from seeds of the plant family. Family members include gourds, melons, pumpkins, and squashes. Examples of oils from that family include bottle gourd oil, buffalo gourd oil, pumpkin seed oil, and watermelon seed oil.

Oils that can be used as food supplements can also be extracted according to this invention. Examples of such oils include Acai oil, blackcurrant seed oil, borage seed oil, and evening primrose oil.

Multipurpose oils that can be used for a variety of end uses, including use as biofuel, can also be extracted. Examples of such oils include castor oil, coconut oil, corn oil, cottonseed oil, false flax oil, hemp oil, mustard oil, palm oil, peanut oil, radish oil, rapeseed oil, ramtil oil, rice bran oil, Other types of oils that can be extracted from plant material and used as biofuel include algae oil, camelina oil, copaiba oil, honge oil, jatropha oil, milk bush, and petroleum oil. Marine tissue is also extractable including fish, shell fish, and various aquatic plants, including the genus Hydrilla, and including various classes of algae.

Drying oils can also be extracted. Examples of such oils include dammar oil, linseed oil, poppyseed oil, stillingia oil, tung oil, and veronica oil.

Other oils having a variety of uses further include amur cork tree fruit oil, apple seed oil, balanos oil, bladderpod oil, brucea javanica oil, burdock oil, candlenut oil, carrot seed oil, chaulmoogra oil, crambe oil, cuphea oil, lemon oil, mango oil, mowrah butter, neem oil, ojon oil, orange oil, rosehip seed oil, sea buchthorn oil, shea butter, snowball seed oil, tall oil, tamanu oil, and tonka bean oil.

Waste oil can be extracted from sand, gravel and soil in the remediation of airports, service stations and waste oil pits. Further within the parameters of this invention, other waste oil can be successfully removed from a wide variety of porous materials including rags, clothing, floor coverings and absorbents.

Solute from oil sands can also be extracted according to this invention. Oil sands are also referred to as tar sands. These materials can be found in large amounts in many countries throughout the world, but are found in extremely large quantities in Canada and Venezuela. Solute from this type of solute-bearing material includes at least a portion of bitumen or extra heavy oil. Bitumen is a mixture of organic liquids that are highly viscous, black, sticky, and generally soluble in carbon disulfide. Naturally occurring or crude bitumen is a sticky, tar-like form of petroleum which is extremely thick and heavy, and is typically heated or diluted so that it will flow. At ambient temperatures, bitumen has a consistency much like cold molasses.

This invention allows for extraction of at least a portion of bitumen from materials such as oil sands. The extracted bitumen-type material can be further processed for use as fuels or lubricants.

The solute-bearing material from which solute is extracted according to this invention is provided as, or made into, particles having an appropriate size to most effectively extract the solute from the solute-bearing material. In one embodiment, the particle size is measured using standard US Mesh sieves or screens. Preferably, particles of solute-bearing material are fed to the extraction chamber such that a majority of the particles fed to the extraction chamber passes through a 5 mesh sieve, but is retained by a 40 mesh sieve. More preferably, the particles of solute-bearing material are fed to the extraction chamber such that a majority of the particles fed to the extraction chamber passes through a 7 mesh sieve, especially an 8 mesh sieve, more especially a 10 mesh sieve. Still more preferably, a majority of the particles fed to the extraction chamber is retained by a 35 mesh sieve, especially 30 mesh sieve, more especially a 20 mesh sieve.

In another embodiment of the invention, particles of solute-bearing material are fed to the extraction chamber such that the particles of the solute-bearing material that are fed to an extraction chamber have an average particle size of from 400 microns to 3400 microns. Preferably, the solute-bearing material fed to the extraction chamber has an average particle size of from 450 microns to 3000 microns, more preferably from 500 microns to 2500 microns, and most preferably 550 microns to 2000 microns.

In one embodiment, the solute-bearing material fed to the extraction chamber is a vegetable material and a majority of the particles of vegetable material fed to the extraction chamber passes through a 16 mesh sieve, but is retained by a 40 mesh sieve. Preferably, a majority of the particles of vegetable material fed to the extraction chamber passes through an 18 mesh sieve, especially a 20 mesh sieve. Still more preferably, a majority of the particles of vegetable material fed to the extraction chamber is retained by a 35 mesh sieve, especially a 30 mesh sieve.

In one embodiment, the solute-bearing material fed to the extraction chamber is a vegetable material and the vegetable material fed to the extraction chamber has an average particle size of from 400 microns to 1200 microns. Preferably, the vegetable material has an average particle size of from 500 microns to 1000 microns, and more preferably an average particle size of from 550 microns to 800 microns.

In one embodiment, the solute-bearing material fed to the extraction chamber is oil sand and a majority of the particles of oil sand fed to the extraction chamber passes through a 6 mesh sieve, but is retained by a 25 mesh sieve. Preferably, a majority of the particles of oil sand fed to the extraction chamber passes through a 7 mesh sieve, especially an 8 mesh sieve. Still more preferably, a majority of the particles of oil sand fed to the extraction chamber is retained by a 20 mesh sieve, especially an 18 mesh sieve.

In another embodiment, the solute-bearing material fed to the extraction chamber is oil sand and the oil sand fed to the extraction chamber has an average particle size of from 800 microns to 3400 microns. Preferably, the oil sand has an average particle size of from 900 microns to 2800 microns, and more preferably an average particle size of from 1000 microns to 2200 microns.

III. Extraction Solvent

According to another aspect of this invention, the solvent is in its liquid state as the solvent is fed to (e.g., introduced into or injected into) the extraction chamber. As understood, the solvent being in the liquid state means that the conditions of supplying the solvent are such that the solvent is predominantly in the liquid state, as some portion of the solvent will naturally seek equilibrium between its vapor and liquid state. Thus, a majority of the solvent is fed to the extraction chamber in its liquid state. Preferably, conditions within the extraction chamber are maintained such that a majority of the solvent remains in the liquid state as the solvent is contacted with the solute bearing material. By maintaining a majority of the solvent in the liquid state during contact with solute-bearing material, extraction of solute is significantly enhanced.

Appropriate solvents can be chosen based on vapor pressure of the solvent as a major characteristic. Vapor pressure, also known as equilibrium vapor pressure, is considered the pressure of a vapor phase composition in equilibrium with its non-vapor phases. All liquids and solids have a tendency to evaporate to a gaseous form, and all gases have a tendency to condense back into their original form (either liquid or solid). At any given temperature below the critical temperature for a particular substance, there is a pressure at which the gas of that substance is in dynamic equilibrium with its liquid or solid forms. This is the vapor pressure of that substance at that temperature.

In a particular embodiment, the solvent has a vapor pressure of at least 1 atm at a temperature of 50° C. Preferably, the solvent has a vapor pressure of at least 1.1 atm, more preferably at least 1.2 atm, and most preferably at least 1.3 atm at a temperature of 50° C.

The solvent used in this invention is a hydrocarbon, meaning that the solvent contains at least one carbon atom and at least one hydrogen atom. Preferably, the solvent is a $C_1$-$C_5$ hydrocarbon. More preferably the solvent is a $C_2$-$C_4$ hydrocarbon, and most preferably a $C_3$-$C_4$ hydrocarbon. Preferred hydrocarbon solvents have vapor pressures as described above. Examples of particularly preferred hydrocarbons include propane, dimethyl ether, methyl chloride, butane, neo-pentane, and diethyl ether, as well as mixtures of the hydrocarbons having the desired vapor pressures.

The solvent that contacts the solute-bearing material is preferably introduced or injected into the extraction chamber in globule form. The term globule indicates that the solvent is in the form of a liquid droplet. Preferably, solvent that is used according to this invention is fed to, introduced into, or injected into the extraction chamber to extract solute at an average globule size that most effectively extracts the solute from the solute-bearing material.

Injection solvent into the extraction chamber can be accomplished using any nozzle-type of injection equipment suitable for forming globules. Such nozzles are supplied, for example, by BETE Fog Nozzle, Inc., Greenfield, Mass. Given the specific solvent used, and the pressure and temperature of the solvent at the injection point, a manufacturer is capable of supplying a nozzle for injecting the particular solvent at the desired or predetermined globule size.

In this invention, nozzles were supplied to provide the predetermined globule size for propane solvent injected through the nozzles at a supply temperature of 80° F. (36.7° C.) and pressure of 168 psia (11.4 atm). All globule sizes indicated according to this invention are, therefore, based on supply temperature of 80° F. (36.7° C.) and pressure of 168 psia (11.4 atm).

In one embodiment of the invention, the solvent is injected into the extraction chamber at an average globule size of from 500 microns to 2500 microns. Preferably, the solvent is injected into the extraction chamber at an average globule size of from 600 microns to 2250 microns, and more preferably from 700 microns to 2000 microns.

In one embodiment, the solute-bearing material is a vegetable material and the solvent that contacts the solute-bearing material is injected into the extraction chamber at an average globule size of from 500 microns to 1200 microns. Preferably, the solvent that contacts the solute-bearing material is injected into the extraction chamber at an average globule size of from 600 microns to 1100 microns, and more preferably from 700 microns to 1000 microns.

In another embodiment, the solute-bearing material is oil sand and the solvent that contacts the solute-bearing material is injected into the extraction chamber at an average globule size of from 1000 microns to 2500 microns. Preferably, the solvent that contacts the solute-bearing material is injected into the extraction chamber at an average globule size of from 1100 microns to 2200 microns, and more preferably from 1200 microns to 2000 microns.

The injection of the particles of solute-bearing material and globules of extraction solvent into the extraction chamber is controlled so that excess solvent is not left in the solute-bearing material following extraction. Preferably, the injection of the particles of solute-bearing material and globules of extraction solvent into the extraction chamber is controlled so that the solute-bearing material from which the solute has been extracted contains not greater than 20 wt % solvent, based on total weight of the solute-bearing material. More preferably the injection of the particles of solute-bearing material and globules of extraction solvent into the extraction chamber is controlled so that the solute-bearing material from which the solute has been extracted contains not greater than 15 wt % solvent, and most preferably not greater than 10 wt % solvent, based on total weight of the solute-bearing material.

In one embodiment, the injection of particles of solute-bearing material and globules of extraction solvent into the extraction chamber is controlled so as to extract the desired content of solute. Preferably, the injection of the particles of solute-bearing material and globules of extraction solvent into the extraction chamber is controlled so that the solute-bearing material from which the solute has been extracted contains not greater than 10 wt % solute, based on total weight of the solute-bearing material. More preferably the injection of the particles of solute-bearing material and globules of extraction solvent into the extraction chamber is controlled so that the solute-bearing material from which the solute has been extracted contains not greater than 8 wt % solute, and most preferably not greater than 5 wt % solute, based on total weight of the solute-bearing material.

In one embodiment, the particles and globules are fed to the extraction chamber at an average particle size to average globule size ratio of from 1:0.5 to 1:3. Preferably, the particles and globules are fed to the extraction chamber at an average particle size to average globule size ratio of from 1:0.6 to 1:2, more preferably from 1:0.8 to 1:1.8; and most preferably from 1:0.9 to 1:1.6.

In a particular embodiment, the solute-bearing material is vegetable matter and the particles and globules are fed to the extraction chamber at an average particle size to average globule size ratio of 1:>1, preferably 1:≥1.05, more preferably 1:≥1.1. Preferably, the particles and globules are fed to the extraction chamber at an average particle size to average globule size ratio of 1:≤3, more preferably 1:≤2.5, and most preferably 1:≤2.

In a particular embodiment, the solute-bearing material is oil sand and the particles and globules are fed to the extraction chamber at an average particle size to average globule size ratio of 1:≤1, preferably 1:≤0.99, more preferably 1:≤0.98. Preferably, the particles and globules are fed to the extraction chamber at an average particle size to average globule size ratio of 1:≥0.5, more preferably 1:≥0.6, and most preferably 1:≥0.7.

The amount of solute-bearing material fed to the reaction chamber relative to the amount of extraction solvent injected into the reaction chamber is also preferably controlled to avoid excess solvent remaining in the solute-bearing material and extract the desired amount of solute. In one embodiment, the solute-bearing material and solvent are fed to the extraction chamber at a weight ratio of solute-bearing material to extraction solvent of from 50:1 to 0.5:1. Preferably, the solute-bearing material and solvent are fed to the extraction chamber at a weight ratio of solute-bearing material to extraction solvent of from 30:1 to 1:1, more preferably from 20:1 to 2:1.

IV. Extraction Chamber and Process Conditions

Any type of extraction chamber can be used that is capable of providing contact between the solute-bearing material and the solvent and extracting the solute from the solute-bearing material. For example, horizontal or vertical type extractors can be used. The solid can be moved through the extractor by pumping, such as by auger-type movement, or by fluidized type of flow, such as free fall or free flow arrangements.

The solvent is preferably injected into the extraction chamber by way of nozzle-type devices capable of providing the desired globule sizes. Nozzle manufacturers are capable of supplying any number of nozzle types based on the globule size desired.

The extraction chamber is preferably operated at a pressure such that the solvent contacts the solute-bearing material predominantly in the liquid state. Preferably, the particles of solute-bearing material are contacted with the globules of extraction solvent at an extraction chamber pressure greater than that of the solvent's vapor pressure.

In one embodiment, the particles of solute-bearing material are contacted with the globules of extraction solvent at an extraction chamber pressure in the range of from 2 atm to 30 atm. More preferably, the particles of solute-bearing material are contacted with the globules of extraction solvent at an extraction chamber pressure in the range of from 3 atm to 20 atm.

The extraction chamber is preferably operated at a temperature such that the solvent contacts the solute-bearing material in the liquid state. In one embodiment, the particles of solute-bearing material are contacted with the globules of extraction solvent at an extraction chamber temperature of at least 0° C. Preferably, the particles of solute-bearing material are contacted with the globules of extraction solvent at an extraction chamber temperature of at least 10° C., more preferably at least 15° C., and most preferably at least 20° C.

It is preferred to not use high temperatures to carry out the extraction process. Preferably, the extraction chamber is maintained at a temperature below which any substantial degradation of liquid hydrocarbons or denaturing of proteins occurs. In one embodiment, the particles of solute-bearing material are contacted with the globules of extraction solvent at an extraction chamber temperature of less than 100° C., more preferably not greater than 75° C., still more preferably not greater than 50° C., and most preferably not greater than 40° C.

IV. Separation of Solute, Oil and Solid

Following extraction of the solute, a mixture of the solute and solvent is collected. The mixture in some cases can be separated by liquid-liquid separation, and in other cases by liquid-vapor separation.

In one embodiment, the solvent is partially or fully vaporized and separated from the solute. The solvent can be reused for further extraction, if desired. Vaporization can be carried out by any means capable of at least partially evaporating the solvent, such as by flash evaporation or distillation.

V. Examples

Particles of solute-bearing material were fed to an extraction chamber and moved through the extraction chamber while being contacted with globules of solvent. The extraction chamber consisted of an auger type moving device in which the auger was used to move the particles through the chamber, and solvent was injected into the extraction chamber as the particles moved through the extraction chamber. An example of the device is depicted in U.S. Pat. No. 7,384,557.

Multiple runs were carried out using different types of solute-bearing material. Effectiveness of solute extraction was evaluated comparing particle size of the solute-bearing material and globule size of solvent injected into the extraction chamber under the following conditions:

Uniform test conditions:
Solvent: 99.5% propane
Nozzle: Bete Fog Nozzle, 60° full cone
Residence time: 3 minutes 22 seconds
Flow rate, solvent: 2.5±0.25 gpm (9.5±1 l/min, 4.8±0.5 kg/min)
Ambient temperature: 80° F.
Injected solvent pressure: 168 psia (11.4 atm)
Extractor pressure: 148 psia (10.1 atm)
Variable test conditions are shown in the following tables for each run indicated:

PRODUCT RUN AA 438 B
OIL SEED RAPE, 43% OIL CONTENT

| SAMPLE NUMBER | PARTICLE SIZE IN MICRONS | SOLVENT GLOBULE SIZE IN MICRONS | WT % RESIDUAL SOLVENT IN MEAL | WT % RESIDUAL OIL IN MEAL |
|---|---|---|---|---|
| TEST A | 500 | 875 | 13.27 | 3.27 |
| TEST B | 600 | 875 | 9.03 | 3.00 |
| TEST C | 700 | 875 | 0.77 | 2.15 |
| TEST D | 800 | 875 | 2.79 | 16.03 |
| TEST E | 900 | 875 | 2.20 | 22.21 |
| TEST F | 1000 | 875 | 3.06 | 27.16 |

PRODUCT RUN AA 438 C
*CAMELINA* SEED, 36% OIL CONTENT

| SAMPLE NUMBER | PARTICLE SIZE IN MICRONS | SOLVENT GLOBULE SIZE IN MICRONS | WT % RESIDUAL SOLVENT IN MEAL | WT % RESIDUAL OIL IN MEAL |
|---|---|---|---|---|
| TEST A | 500 | 875 | 8.49 | 4.07 |
| TEST B | 600 | 875 | 4.58 | 3.85 |
| TEST C | 700 | 875 | 0.82 | 2.02 |
| TEST D | 800 | 875 | 1.94 | 9.83 |
| TEST E | 900 | 875 | 3.11 | 16.39 |
| TEST F | 1000 | 875 | 5.29 | 19.62 |

PRODUCT RUN AA 438 D
PECAN, 63% OIL CONTENT

| SAMPLE NUMBER | PARTICLE SIZE IN MICRONS | SOLVENT GLOBULE SIZE IN MICRONS | WT % RESIDUAL SOLVENT IN MEAL | WT % RESIDUAL OIL IN MEAL |
|---|---|---|---|---|
| TEST A | 500 | 875 | 10.33 | 3.74 |
| TEST B | 600 | 875 | 5.81 | 2.19 |
| TEST C | 700 | 875 | 0.87 | 1.09 |
| TEST D | 800 | 875 | 1.89 | 8.36 |
| TEST E | 900 | 875 | 4.00 | 14.94 |
| TEST F | 1000 | 875 | 6.84 | 18.64 |

In a second series of test runs, a different classification of feedstock material was used, with uniform conditions as set for in the first series above. This series of runs exemplifies the extraction of essential oils from aromatic plants. Three aromatic plants containing essential oils were chosen: bay leaf, with an oil content of 3.02%, jojoba, with an extractable liquid content of 46% and cinnamon with an oil content of 0.96%. These extractions were of particular interest because the oil is unlike other seed oils and because there was such a wide range of oil content. Cinnamon has an oil content of less than 1% and jojoba nearly 50%. The results were considered significant, because the extraction yielded results similar to the previous runs.

PRODUCT RUN AA 438 B
BAY LEAF - 3.02% OIL CONTENT

| SAMPLE NUMBER | PARTICLE SIZE IN MICRONS | SOLVENT GLOBULE SIZE IN MICRONS | WT % RESIDUAL SOLVENT IN MEAL | WT % RESIDUAL OIL IN MEAL |
|---|---|---|---|---|
| TEST A | 500 | 875 | 9.27 | 0.93 |
| TEST B | 600 | 875 | 1.26 | 0.02 |
| TEST C | 700 | 875 | 2.09 | 0.31 |
| TEST D | 800 | 875 | 3.36 | 0.94 |
| TEST E | 900 | 875 | 3.48 | 1.72 |
| TEST F | 1000 | 875 | 3.86 | 2.96 |

PRODUCT RUN AA 438 C
CINNAMON, 0.96% OIL CONTENT

| SAMPLE NUMBER | PARTICLE SIZE IN MICRON | SOLVENT GLOBULE SIZE | % RESIDUAL SOLVENT IN MEAL | % RESIDUAL OIL IN MEAL |
|---|---|---|---|---|
| TEST A | 500 | 875 | 7.75 | 0.07 |
| TEST B | 600 | 875 | 2.03 | 0.00 |
| TEST C | 700 | 875 | 2.00 | 0.33 |
| TEST D | 800 | 875 | 2.99 | 0.41 |
| TEST E | 900 | 875 | 3.48 | 0.49 |
| TEST F | 1000 | 875 | 4.02 | 0.56 |

PRODUCT RUN AA 438 D
JOJOBA, 49.95% EXTRACTABLE LIQUID CONTENT

| SAMPLE NUMBER | PARTICLE SIZE IN MICRON | SOLVENT GLOBULE SIZE | % RESIDUAL SOLVENT IN MEAL | % RESIDUAL OIL IN MEAL |
|---|---|---|---|---|
| TEST A | 500 | 875 | 5.00 | 3.74 |
| TEST B | 600 | 875 | 3.75 | 3.69 |
| TEST C | 700 | 875 | 5.30 | 5.23 |
| TEST D | 800 | 875 | 6.04 | 7.99 |
| TEST E | 900 | 875 | 7.87 | 15.26 |
| TEST F | 1000 | 875 | 6.84 | 17.58 |

In a third series of test runs a different type of feedstock was used, also with uniform conditions as set for in the first series above. This series exemplifies extraction of solute from hydrocarbon bearing sand deposits (tar sands). The three selected samples were Low Grade Canada Ore with a hydrocarbon content of 9%, a High Grade Canada Ore with a hydrocarbon content of 13.7% and a Utah Ore with a hydrocarbon content of 8%. Each was pulverized by mechanical or cryogenic methods to a granulated state, then passed through a minimum and maximum sized standard US mesh sieve, resulting in a relatively uniformed sized feedstock particle. Several batches of uniform sized feedstock were prepared. Because tar sands has a tendency to reassemble into larger units the feedstock was immediately placed into the extractor to prevent the increase in particle size. Each sample run was conducted with a single sized spray nozzle that resulted in a consistent globule size, while the size of the feedstock was changed with results recorded at each feedstock size. The results are recorded below.

PRODUCT RUN AA 556 A
CANADIAN, LOW GRADE TAR SAND ORE,
9% HYDROCARBON CONTENT

| SAMPLE NUMBER | PARTICLE SIZE IN US MESH (MICRONS) | SOLVENT GLOBULE SIZE IN MICRONS | WT % RESIDUAL SOLVENT IN SAND | WT % PERCENT EXTRACTION |
|---|---|---|---|---|
| TEST A | 6 (3360) | 1600 | 15.77 | 86.88 |
| TEST B | 8 (2380) | 1600 | 12.79 | 91.30 |
| TEST C | 10 (2000) | 1600 | 6.06 | 97.79 |
| TEST D | 12 (1680) | 1600 | 5.23 | 99.20 |
| TEST E | 14 (1410) | 1600 | 8.81 | 98.73 |

PRODUCT RUN AA 556 B
CANADIAN HIGH GRADE TAR SAND ORE,
13.7% HYDROCARBON CONTENT

| SAMPLE NUMBER | PARTICLE SIZE IN US MESH (MICRONS) | SOLVENT GLOBULE SIZE IN MICRONS | WT % RESIDUAL SOLVENT IN SAND | WT % PERCENT EXTRACTION |
|---|---|---|---|---|
| TEST A | 6 (3360) | 1600 | 9.83 | 90.23 |
| TEST B | 8 (2380) | 1600 | 7.72 | 94.47 |
| TEST C | 10 (2000) | 1600 | 5.44 | 98.81 |
| TEST D | 12 (1680) | 1600 | 4.89 | 99.00 |
| TEST E | 14 (1410) | 1600 | 4.87 | 97.63 |

PRODUCT RUN AA 556 C
UTAH TAR SAND ORE, 8% HYDROCARBON CONTENT

| SAMPLE NUMBER | PARTICLE SIZE IN US MESH (MICRONS) | SOLVENT GLOBULE SIZE IN MICRONS | WT % RESIDUAL SOLVENT IN SAND | WT % PERCENT EXTRACTION |
|---|---|---|---|---|
| TEST A | 6 (3360) | 1600 | 10.30 | 93.33 |
| TEST B | 8 (2380) | 1600 | 5.03 | 96.89 |
| TEST C | 10 (2000) | 1600 | 3.22 | 99.12 |
| TEST D | 12 (1680) | 1600 | 2.89 | 99.89 |
| TEST E | 14 (1410) | 1600 | 2.89 | 96.60 |

The principles and modes of operation of this invention have been described above with reference to various exemplary and preferred embodiments. As understood by those of skill in the art, the overall invention, as defined by the claims, encompasses other preferred embodiments not specifically enumerated herein.

The invention claimed is:

1. A process for extracting solute from a solute-bearing material comprised of vegetable material, the process comprising the steps of:
   feeding particles of the solute-bearing material to an extraction chamber, wherein the particles fed to the extraction chamber have an average particle size of from 550 microns to 800 microns;
   injecting globules of an extraction solvent comprised of a $C_2$-$C_4$ hydrocarbon into the extraction chamber to contact the particles of the solute-bearing material and extract at least a portion of the solute comprised of oil from the solute-bearing material, wherein the solvent is injected into the extraction chamber at an average globule size of from 500 microns to 1200 microns and the particles of the solute-bearing material and the globules of extraction solvent are fed to the extraction chamber at an average particle size to average globule size ratio of 1:>1 and 1:<3;
   collecting a mixture of the extracted solute and solvent from the extraction chamber; and
   separating the solute from the solvent by vaporization.

2. The process of claim 1, wherein the extraction solvent is fed to the extraction chamber such that a major portion of the extraction solvent is in its liquid state.

3. The process of claim 1, wherein the particles of solute-bearing material are contacted with the globules of extraction solvent at an extraction chamber pressure greater than that of the solvent's vapor pressure.

4. The process of claim 1, wherein the solvent has a vapor pressure of at least 1 atm at a temperature of 50° C.

* * * * *